United States Patent [19]

Drexler

[11] 4,319,252
[45] Mar. 9, 1982

[54] OPTICAL DATA STORAGE AND RECORDING MEDIUM HAVING A REPLACEABLE PROTECTIVE COVERPLATE

[75] Inventor: Jerome Drexler, Los Altos Hills, Calif.

[73] Assignee: Drexler Technology Corporation, Mountain View, Calif.

[21] Appl. No.: 170,801

[22] Filed: Jul. 21, 1980

[51] Int. Cl.³ .......................................... G01D 15/34
[52] U.S. Cl. .................................. 346/135.1; 369/284; 428/64; 430/945; 430/961
[58] Field of Search .................. 346/135.1, 76 L; 430/945, 961, 12; 428/64, 65; 369/284, 285

[56] References Cited

U.S. PATENT DOCUMENTS

| | | | |
|---|---|---|---|
| 3,079,837 | 3/1963 | Theilemann | 430/961 X |
| 3,443,946 | 5/1969 | Grabhofer | 430/961 X |
| 3,990,084 | 11/1976 | Hamisch | 346/135.1 |
| 4,074,282 | 2/1978 | Balas | 346/135.1 |
| 4,090,031 | 5/1978 | Russell | 358/130 |
| 4,101,907 | 7/1978 | Bell | 346/135.1 |
| 4,109,045 | 8/1978 | Goshima | 428/212 |
| 4,126,726 | 11/1978 | Soeding | 428/64 X |
| 4,188,433 | 2/1980 | Dijkstra | 428/64 |
| 4,195,312 | 3/1980 | Bell | 346/135.1 X |
| 4,195,313 | 3/1980 | Bell | 346/135.1 X |

Primary Examiner—Joseph W. Hartary

[57] ABSTRACT

A protective removable coverplate for a reflective optical data storage and recording medium wherein a transparent coverplate is removably disposed over a transparent coating which is in intimate contact with the reflective medium. A slightly bumpy upper surface of the coating supports the coverplate with air gaps existing between the coating and the coverplate to a maximum depth of one micron under hand pressure on the coverplate.

5 Claims, 1 Drawing Figure

OPTICAL DATA STORAGE AND RECORDING MEDIUM HAVING A REPLACEABLE PROTECTIVE COVERPLATE

TECHNICAL FIELD

The invention relates to reflective optical data storage and recording media and in particular those having replaceable protective coverplates over the media.

BACKGROUND ART

Over the last few years, several optical data storage and laser recording media have been disclosed. For example, an article in Optical Engineering, Volume 15, Number 2, Mar.-Apr., 1976, page 99, discusses properties of a large number of such media. One major facet of optical data storage media is that the recorded surface must be protected from fingerprints, dust, or other surface contaminants which can cause errors in reading recorded data. This is particularly true when the data storage medium is reflective in nature.

Optical data storage may be achieved in many ways. Where the recording media is reflective in nature, data may be read by reflection, phase shift, scattering or transmission through the media. Some optical data storage media are absorptive rather than reflective. These may be read by transmission of light through clear areas. In the case of reflective data storage and recording materials, most are comprised of a thin metallic film disposed over some supporting substrate. These reflective metallic films are generally electrically conducting, though some reflective materials are not. An example of an electrically non-conducting reflective optical data storage and recording medium is that disclosed in application Ser. No. 55,270 filed July 6, 1979, by Bouldin and Drexler, now U.S. Pat. No. 4,278,756. The metallic film is then covered or encapsulated with a transparent protective coating or coverplate so that data images are not obscured by fingerprints, dust particles, or other common surface contaminants. After encapsulation any surface contamination or damage affects only the outer surface of the protective layer and not the data on the reflective surface. The diameter of the laser beam used either to read or record is much larger at the outer surface than at the data spot, so that imperfections on the surface of the coverplate have little effect on the read or recording signal.

Dijkstra, in U.S. Pat. No. 4,188,433, issued Feb. 12, 1980, discloses a disc shaped optical data storage carrier which is provided with a reflective metal layer which is protected by a coverplate having a thickness of 0.2 to 1 millimeter. This coverplate is attached to the reflective metal layer by an ultraviolet curable lacquer. The difficulty Dijkstra was attempting to overcome is the inherent surface drying problem involved in coating lacquers. Previously, thick lacquer layers, used to separate dust and scratches from the data surface, displayed considerable internal stress so that the lacquer readily peeled off the reflective surface. In addition, when a polymerization initiator is present in the lacquer layer, it will be more active in the outer parts of the lacquer layer than in the deeper situated parts. In addition, curing time for most lacquers is comparatively long, thus allowing the lacquer to attack the supporting substrate. As a result of these problems, Dijkstra employed unltraviolet curable lacquers which had decreased curing times and were more tenacious.

Hamisch, in U.S. Pat. No. 3,990,084, issued Nov. 2, 1976, discloses an information carrier suitable for recording and storage. This information carrier had a data recording and storage layer composed of a mixture of bismuth, antimony and selenium and a different element of the group selenium and tellurium. Information was recorded on this layer by burning away selected regions with a laser. A coating of lacquer may be applied to this information carrying layer either prior to the recording of information or subsequent thereto. This lacquer layer is applied to protect the information carrying layer against damage and dirt.

One problem heretofore not dealt with by the prior art has been the formation of Newton rings when a coverplate contacts a reflective data storage surface without being bonded to it. Newton rings are concentric rings, not usually perfect circles, produced when one plane surface is held in contact with another, by interference between directly transmitted light and that transmitted after being reflected back and forth between layers imperfectly in contact. In the above cited prior art, Newton rings were avoided by having lacquer-bonded contact with the coverplate and the reflective surface. However, the use of bonding lacquers slows the manufacturing process and introduces design restrictions to permit this bonding procedure. An alternative method of avoiding Newton rings is by spacing the coverplate so that it does not contact the reflective surface but is very close to it. This method may be adequate if the reflective surface is stiff and the small spacing between the coverplate and the reflective surface can be maintained relatively uniformly. If the reflective surface is on a thin flexible film, maintaining this small spacing over a large area presents a problem.

Another problem heretofore not dealt with in the prior art is providing replaceable coverplates over optical data storage media. Thus if the coverplate encapsulating valuable stored optical data is damaged by scratches, melting or distortion it may be replaced, thus preserving the optical data.

An object of the present invention is to find a general method of avoiding Newton rings created by placing a coverplate on a reflective data storage and recording layer. Another object of the invention is to provide a sterile environment for the reflective data storage and recording layer. Yet another object of the invention is to provide an economical and practical optical data storage and recording medium.

DISCLOSURE OF INVENTION

The above objects have been met by the discovery of a laminate structure which includes a very thin transparent coating in intimate contact with a reflective surface with an air gap intermediate the coating and a coverplate. The coverplate is not bonded to the thin transparent coating but rests on the bumpy upper surface of the coating. In one sense, the thin transparent coating and air gap act as a minimum spacing device between the reflective surface and the coverplate to shift the location of imperfect contact with a coverplate from the reflective surface to another location by relocating the site of imperfect contact between the coverplate and an intermediate transparent layer. Newton rings are not visible or are less visible when the thin transparent coating is used.

The very thin coating which covers the reflective surface need not be an adhesive, because its purpose is not the adhesion of a protective coverplate, but rather provides a minimum spacing between the coverplate and the reflective surface to inhibit the formation of Newton rings. Similar coatings on the transparent coverplate do not seem to inhibit Newton rings at the reflective surface, but since the refractive index of these coatings is typically similar to that of the coverplate, for example, glass or polymethylmethacrylate, it is not surprising that these thin coatings do not create the optical equivalent of a physical spacing.

DESCRIPTION

Figure 1:
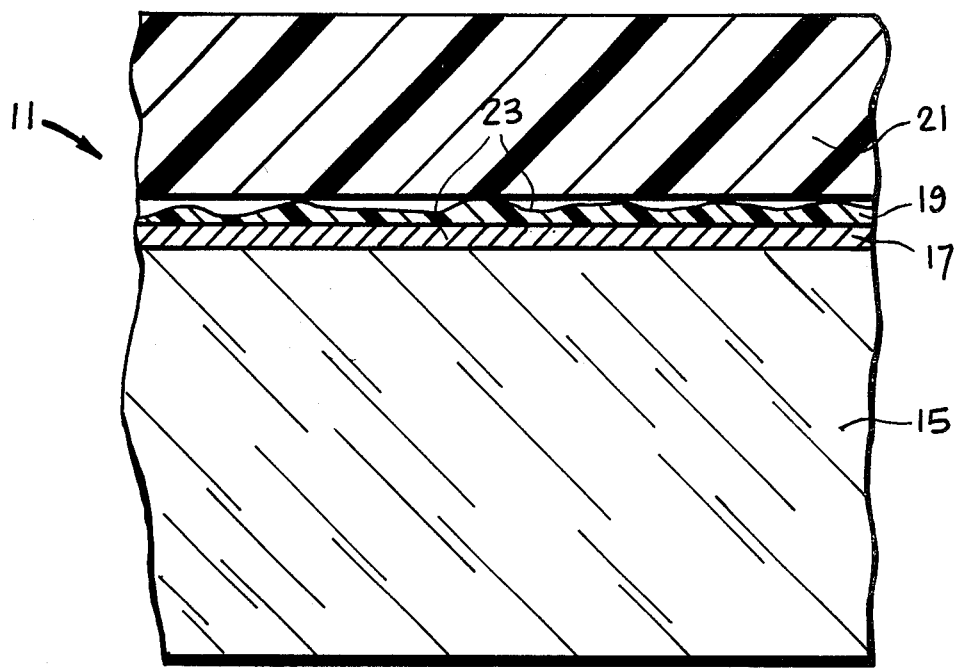
FIG. 1 is a schematic side sectional view of the laminate structure of the optical data storage and recording medium of the present invention.

FIG. 1 illustrates the present invention. The reflective optical data storage and recording medium, 11, consists of at least three distinct layers. The supporting substrate, 15, may be a transparent or opaque material which has sufficient dimensional stability to support reflective layer, 17. The supporting substrate may be glass or some suitably chosen plastic. However, if a plastic supporting substrate is used, it is important to avoid using chemicals in later processing steps which attack or may dissolve the supporting substrate. The medium, 11, may be either a laser recording medium or an optical data storage medium or both. For convenience, the medium will be referred to as an optical data storage and recording medium, even though the present invention applies in the disjunctive.

Reflective layer, 17, is disposed atop the supporting substrate, 15, in an adhesive manner. As used herein, adhesive refers to molecular attraction which is exerted between the surfaces and bodies which are in contact. It is possible to apply a reflective layer onto the supporting substrate in many different ways. It may be done by sputtering metals onto the supporting substrate in a vacuum chamber. Alternatively, the reflective layer may be coated on a subbing layer, such as those used in photographic films and thus may be applied directly to the supporting substrate by an adhesive. Some reflective layers are electrically non-conducting, consisting of very small metal dispersions in a suspensive matrix. As used herein, the word reflective means that at least 15 percent of the radiation used to read or record on the optical data storage and recording medium is reflected.

It will be understood that no attempt has been made to duplicate either the exact dimensions of the various layers or their proportions in both FIG. 1.

As shown in FIG. 1, the reflective layer may have an uneven surface. This may result from recording or from mechanical deformities in the reflective layer. As shown in FIG. 1, a very thin transparent coating, 19, is applied contiguously to the reflective layer. The thin transparent coating must entirely cover the surface of the reflective layer but only needs to be sufficiently thick so that coverplate, 21, does not actually contact the reflective layer. The formation of Newton rings is prevented by creating a non-contacting space between the coverplate and the reflective layer. Part of this space is an air gap 23 between the upper surface of the coating and the cover plate. The air gap is less than one micron in depth and exists over at least 50% of the surface of the transparent layer. An air gap is introduced by bumpiness in the upper surface of the transparent coating. The thin transparent coating may be as thin as 1½ microns and as thick as 15 microns, although thinner and thicker coatings may be used.

Since Newton rings are only created when there is a substantial degree of internal reflection between two plane surfaces held in uneven contact, the thin transparent coating and air gap of the present invention act to separate the plane surface of the coverplate from the surface of the reflective layer.

In the method of the present invention it is not desirable for the thin transparent coating to be adhesive to the coverplate, unlike the lacquer layers disclosed in the prior art. It is preferable to create an article which consists solely of a supporting substrate and a reflective layer atop such supporting substrate which may or may not include pre-recorded information. Pre-recording means information recorded by other than laser melting such as photographic recording, photolithographic recording or physical pressing. Pre-recording would normally be done before the thin transparent coating is applied. After such pre-recording, the thin transparent coating may be applied and a coverplate added. Alternatively, an entire article, including coverplate, thin transparent coating, reflective layer and its supporting substrate, may be manufactured for either recording or data storage. As used herein, transparent means transmissive to that radiation used to either read or record on the optical data storage and recording medium of the present invention. Therefore, since the thin transparent coating is transmissive to the recording radiation used, it is possible to record through it. This may be accomplished by focusing the radiation source, usually a laser beam, at the surface of the reflective layer. When the optical data storage and recording medium of the present invention is used for recording, the coverplate must also be transparent.

The purpose of the coverplate is primarily to protect the recording reflective layer. To accomplish this the coverplate preferably has a thickness of between 0.2 and 1 millimeter, although thicker and thinner coverplates may be used for different media. The coverplate must be sufficiently thick to keep the surface dust particles out of focus so that the data may be read or recorded without occlusion. The coverplate is preferably a durable material, such as glass or a high-impact plastic and should be replaceable. Both the coverplate and the thin transparent coating may incorporate an attenuating dye to protect the reflective layer from undesired incident radiation.

The thin transparent coating may be applied to the reflective layer in any of a number of different fashions. Generally, the thin transparent layer is applied as a liquid and then dried, after which it becomes hard. The thin transparent coating should not be adhesive to the coverplate because the coverplate must be removable. A particularly useful compound for forming a thin transparent layer of the present invention is Transene Photomask Coating-2060, manufactured by Transene Company of Rowley, Mass. The application of Transene may be done by dip-coating, which results in clear layers of approximately 1½ microns. A cure at 85° F. for 30 minutes is required to set the Transene layer. Other materials may be used to form the thin transparent coating of the present invention and may be applied in different manners.

The compounds in the following table are exemplary:
Gelatin
Polyvinyl alcohol
Partial esters of polyvinyl alcohol Polyvinylpyrrolidene
Acrylamide-maleic acid mixtures
Polyamide-acid mixtures
Acrylamide-acrylic acid
Dow-Corning R-4-3117 Conformal Coating (Silicone)

Other compounds may be advantageously used in accord with the present invention so long as they exhibit the requisite characteristics described below. The primary characteristics of the thin transparent coating remain the same—first, that the thin transparent coating entirely cover the reflective layer to a depth of between 1.5 and 15 microns, second, that the thin transparent coating does not chemically react with the supporting substrate causing it to dissolve or destroy the adhesion between supporting substrate and the reflective layer; third, that the upper surface of the transparent coating be slightly bumpy only to the extent that an air gap less than one micron in depth exists between the coverplate and the upper surface of the coating over at least 50% of the surface of the coating when hand pressure is applied to the coverplate against the reflective surface. Such bumpiness is naturally introduced by virtually any coating process where the coating is non-adhesive with respect to the coverplate. In other words, if the coating does not wet the coverplate by molecular attraction, a slight bumpiness will result.

The coverplate may be added by many different methods. When the optical data storage and recording medium consist of two oppositely facing reflective layers atop the same or separate supporting substrates, two coverplates, both of which extend beyond the perimeter of the reflecting layers may be attached to each other in that area which extends beyond the perimeter. In this mode no adhesive lacquer is required to attach the coverplate to the reflective layer but it is important to limit the airgap to less than one wavelength of the reading beam.

The utility of the present invention is in providing a means of replacing damaged coverplates and in the elimination of Newton ring formation in reflective optical data media not bonded to protective coverplates.

EXAMPLE

A reflective optical data storage and recording medium was prepared in accord with the methods discussed above. Prior to the formation of the thin transparent layer, the reflective medium had a reflectivity at 830 nanometers of 27 percent, and at 514 nanometers, of 36.6 percent. The reflective medium was then inserted into a bath containing Transene photomask coating-2060. A 1½ micron coating was thereby created. This coating was then cured as per manufacturer's recommendations at 85° F. for 30 minutes. The upper surface of the coating was slightly bumpy and did not substantially wet or adhere to the coverplate. Subsequently, the now-coated reflective medium displayed slightly reduced reflectivities; at 830 nanometers, 19%; and at 514 nanometers, 22.2%. A glass coverplate was applied with pressure to an uncoated sample of the same reflective medium and Newton rings were observed. When the same coverplate was applied with pressure to the coated reflective medium, with an air gap present over at least 50% of the surface, no Newton rings could be observed.

I claim:

1. A reflective data storage and recording medium comprising, a reflective data surface having transparent coating in intimate contact with the data surface, the coating having a thickness in the range of 1.5 to 15 microns and a slightly bumpy upper surface contacting a transparent coverplate, said bumpy upper surface defining air gaps relative to the coverplate over at least 50% of the upper surface, said air gaps having a maximum depth of one micron under hand pressure on the coverplate.

2. The reflective data storage and recording medium of claim 1 wherein said transparent coating is selected from the group consisting of gelatin, polyvinyl alcohol and partial esters of polyvinyl alcohol.

3. The reflective data storage and recording medium of claim 1 wherein said transparent coating is selected from the group consisting of polyvinylpyrrolidene, acrylamide-maleic acid mixtures, polyamide-acid mixtures and acrylamide-acrylic acid.

4. The reflective data storage and recording medium of claim 1 wherein said transparent coating is Transene Photomask Coating-2060.

5. The reflective data storage and recording medium of claim 1 wherein said transparent coating is a silicone.

* * * * *